(12) United States Patent
Trapp et al.

(10) Patent No.: US 12,399,674 B1
(45) Date of Patent: *Aug. 26, 2025

(54) BICYCLE STEM CAP AUDIO SYSTEM

(71) Applicant: Desert Bloom Innovations LLC, Scottsdale, AZ (US)

(72) Inventors: Benjamin Trapp, Scottsdale, AZ (US); Alexandru Christopher Trapp, Scottsdale, AZ (US); Matthew Jacob Trapp, Scottsdale, AZ (US); Daiana Eva Trapp, Scottsdale, AZ (US)

(73) Assignee: Desert Bloom Innovations LLC, Scottsdale, AZ (US)

( * ) Notice: Subject to any disclaimer, the term of this patent is extended or adjusted under 35 U.S.C. 154(b) by 206 days.

This patent is subject to a terminal disclaimer.

(21) Appl. No.: 18/244,291

(22) Filed: Sep. 10, 2023

Related U.S. Application Data

(63) Continuation-in-part of application No. 17/726,315, filed on Apr. 21, 2022, now Pat. No. 11,755,281.

(60) Provisional application No. 63/223,610, filed on Jul. 20, 2021, provisional application No. 63/450,318, filed on Mar. 6, 2023.

(51) Int. Cl.
| | |
|---|---|
| *G06F 3/16* | (2006.01) |
| *G06F 3/0338* | (2013.01) |
| *G06F 3/0362* | (2013.01) |
| *H04R 1/02* | (2006.01) |
| *H04R 3/00* | (2006.01) |

(52) U.S. Cl.
CPC .......... *G06F 3/165* (2013.01); *G06F 3/0338* (2013.01); *G06F 3/0362* (2013.01); *G06F 3/162* (2013.01); *H04R 1/025* (2013.01); *H04R 1/026* (2013.01); *H04R 3/00* (2013.01); *H04R 2420/09* (2013.01); *H04R 2499/13* (2013.01)

(58) Field of Classification Search
CPC ...... G06F 3/165; G06F 3/0338; G06F 3/0362; G06F 3/162; H04R 1/025; H04R 1/026; H04R 3/00; H04R 2420/09; H04R 2499/13
See application file for complete search history.

(56) References Cited

U.S. PATENT DOCUMENTS

| | | | |
|---|---|---|---|
| 11,755,281 B1 * | 9/2023 | Trapp | B62K 21/12 381/86 |
| 2003/0140727 A1 | 7/2003 | Chuang | |
| 2013/0098959 A1 | 4/2013 | Onogi | |

FOREIGN PATENT DOCUMENTS

| | | | | |
|---|---|---|---|---|
| CA | 3101171 A1 * | 11/2019 | | F16B 5/02 |

* cited by examiner

*Primary Examiner* — Andrew Sniezek
(74) *Attorney, Agent, or Firm* — Invention To Patent Services; Alex Hobson (57) ABSTRACT

A stem cap audio system enables detachable attachment of a speaker assembly to the stem cap of a bicycle. A speaker base is configured to detachably couple to the stem cap. The speaker is coupled to the base and may be configured for easy one-hand operation, wherein functions of the speaker are initiated by simply pushing down on the speaker housing. The speaker housing is configured to actuate or depress down into the speaker base and a speaker control interface is actuated by contact with a portion of the base. An elastomeric interface is configured between the speaker and base to rebound the speaker after actuation to change a function of the speaker operation. This easy one hand operation can be operated while riding and with a gloved hand.

20 Claims, 11 Drawing Sheets

FIG. 1

PRIOR ART

BICYCLE STEM CAP AUDIO SYSTEM

CROSS REFERENCE TO RELATED APPLICATIONS

This application is a continuation in part of U.S. application Ser. No. 17/726,315, filed on Apr. 21, 2022, which claims the benefit of priority to U.S. provisional patent application No. 63/223,610, filed on Jul. 20, 2021, and this application claims the benefit of priority to U.S. provisional patent application No. 63/450,318, filed on Mar. 6, 2023; the entirety of all prior applications are hereby incorporate by reference.

FIELD OF THE INVENTION

The invention relates to a bicycle stem cap audio system including a speaker that is coupled to a stem cap of a bicycle and having and integral control assembly to enable easy control of the speaker functions with a gloved hand.

BACKGROUND

Bicycle enthusiasts have been trying to find a discrete way to enjoy audio while pedaling for as long as portable music has been around. Today, the optimum sound is delivered through the personalized approach of earphones. This has however become a safety hazard, as the user with earphones is not able to hear cyclist as they approach from behind, or pedestrians, or automobiles approaching from behind and alarms or sirens. Speakers are available and configured for mounting to the handlebar of the bicycle. These speaker mount assemblies typically have a band or strap that extends around handlebar. Handlebar mounted speakers have a number of drawbacks. First, handlebar clutter has become an issue as users try to attach many items to their handlebars, such as a GPS for navigation, a phone for communication, lights for nighttime riding, bicycle computers for exercise guidance and the like. Second, remote (or wireless) speakers typically have a significant mass to them, as they contain the magnet of the speaker and a battery, etc. Mounting a mass in a position that is un-centered or in a location that pivots/spins during use can affect the handling performance of the bicycle. Issues such as lean or resistance during turning could be felt by the user. Third, the handlebar mounted speakers are offset from the center of the user and therefore the sound is not uniform in the user's ears. Furthermore, the handlebar mounted speaker will change position with respect to the user and in particular the user's ears as the handlebar is turned for steering. This change is audio perception by the user is not desirable. Fourth, handlebar speakers typically have one or more buttons or switches for interfacing with and changing the functions of the speaker, such as changing the volume, turning on the speaker and the like. Most cyclist ride with gloves and manipulation of these small buttons and/or switches can be difficult and frustrating. Some speakers are controlled by a mobile phone, but many riders have this stowed in a backpack or pouch under the seat during riding and therefore changing the functions of the speaker while riding is not feasible.

SUMMARY OF THE INVENTION

The invention is directed to a stem cap audio system that enables detachable attachment of a speaker assembly to a stem cap on a bicycle. The speaker assembly includes a speaker base that is configured to detachably couple to the stem cap. A stem cap has a stem cap mounting feature that enables the speaker assembly to detachably attach to the stem cap. The speaker base may be configured with threads that are configured to thread onto threads of the stem cap, for example. The speaker housing is coupled to the speaker base and may be configured for easy one-hand operation, wherein functions of the speaker are initiated by simply pushing down on the speaker toward the stem cap, and/or actuating the speaker laterally such as forward or backward and/or actuating the speaker to one side or the opposing side, and/or rotating the speaker.

The speaker housing may be configured to be depressed down and actuate into the speaker base and actuate a speaker control interface, such as a push button, switch or sensor, wherein a portion of the speaker base may make contact a portion of the speaker base, the speaker control interface. The speaker may be configured to actuate laterally or directionally with respect to the speaker base and a lateral control interface may be actuated by this movement. The speaker may be configured to rotate with respect to the speaker base and rotational control interface may be actuated by this movement. An elastomeric interface may be configured between the speaker housing and base to rebound the speaker housing after actuation to change a function of the speaker operation. This easy one hand operation does not require manipulation of a button, only simple movement of the speaker housing, and can be operated while riding and with a gloved hand. A cyclist may push down and hold the speaker down to pause or turn off the speaker when a group of riders stops or to answer a phone call, for example. A cyclist could push the speaker forward to turn the volume up and pull the speaker backwards to turn the volume down, or could push to the right to advance songs in a playlist and left to skip backwards in the playlist.

An exemplary stem cap is configured to attach to the stem of a bicycle. The stem of a bicycle is the portion of the bicycle coupling the forks to the handlebars and includes a steerer tube that extends up through the head tube of the bicycle frame and the stem having a stem aperture that slides down over a steerer tube and is secured thereto. The stem cap is coupled to the steerer tube and is configured over the stem aperture of the stem. A stem cap mounting feature, such as stem threads, may be configured on a stem cap post that extends up from the stem cap flange. The base of the speaker assembly may have threads, female threads, that enable the base to be threaded onto and off the stem cap or stem cap mounting feature. The base may have an attachment aperture that includes base threads to quickly attach and detach the speaker base and speaker assembly to the stem cap. The stem cap mounting feature may also comprise female threads configured to receive male threads extending from the speaker assembly. Other quick attachment and release mechanism may also be used, such as a push and turn engagement, wherein a flange inserted into an aperture is turned to seat with a flange of the opposing component, for example.

The speaker base and speaker housing are coupled together and are configured such that the speaker housing can actuate with respect to the fixed base when the base is attached to the stem cap. A base flange may extend and interface with a speaker flange to retain the speaker on the base. The speaker assembly may have a number of discrete speaker flanges and base flanges to ensure a durable connection between the two components. In one embodiment, the base flange extends in a continuous ring around the perimeter of the speaker base and the speaker housing has a plurality of discrete speaker flanges that are configured to snap fit down over the base flange. The speaker flange or flanges may be configured to snap fit down over the base flange or flanges. This flange interface coupling enables the speaker to actuate with respect to the speaker base.

As described herein, the speaker housing may be actuated down toward the base and stem cap, wherein the speaker interface actuates away from the base flange. An elastic interface is configured between the speaker and the base and is compressed when the speaker is pressed down. The compression of the elastic interface provides a force to move the speaker back up from the base, wherein speaker flange moves toward the base flange. The elastic interface is a material that is deformable by a force and then returns to an original shape, thickness or length, when the deforming force is removed. An elastic interface may be an elastic material, such as silicone, urethane, rubber or other elastomeric materials, including elastomeric foams, or a spring that is shortened upon depression of the speaker housing to provide a rebounding force. An elastic interface may be a ring of material to provide a uniform force regardless of the depressing force location on the speaker housing.

The speaker housing may have a speaker control interface, such as a push button, switch or sensor, that is depressed or actuated by a portion of the base, a base actuator, when the speaker is depressed down toward the base. A base actuator may extend up from the base to hit and actuate the speaker control interface when the speaker is depressed down toward the base. The base actuator may be centrally configured on the base and the speaker control interface may also be centrally located on the speaker. An elastic interface may extend around the base actuator and/or the speaker control interface. This arrangement may provide uniform and reliable actuation of the speaker control interface with a user interface, a depressing force, around the top perimeter of the speaker.

The speaker housing may have a plurality of lateral speaker control interfaces configured to actuate when the speaker is actuated in a particular lateral direction, with respect to the height or vertical axis. The speaker housing may be actuated laterally, or pushed or moved in a lateral direction with respect to the height or vertical axis of the speaker, such as forward and backward and/or side to side. Lateral actuation or direction is orthogonal to the height axis or vertical axis. The lateral speaker control interfaces may be configured to actuate to provide a specific control depending on the lateral direction of movement of the speaker with respect to the speaker base. A forward movement, or away from the cyclist may increase the volume of the music while pulling back on the speaker may reduce the volume. Likewise, pushing the speaker to one side, such as to the right or the cyclist may advance the music or advance to the next song in the song list while pushing the speaker to the left may rewind the music or play the preceding song in the song list. The lateral speaker control interfaces may be located around a perimeter of a centerline of the speaker or at spaced angles about the speaker or speaker base. The lateral speaker control interfaces may be configured at substantially different angles around the speaker such as at least 20 degrees offset from each other. In an exemplary embodiment, the lateral speaker control interfaces are configured at 90 degrees offsets to provide four separate and distinct control functions as aforementioned. The control interfaces may be configured at about 60 degree offsets however and provide six distinct control functions.

The speaker housing may have one or two rotational speaker control interfaces configured to actuate when the speaker is actuated in rotational motion about the height or vertical axis. The speaker housing may be rotated or twisted in a first direction to control a particular function of the speaker and may be rotated in the opposite direction to control the same or a different function. Rotation of the speaker housing with respect to the base may change the volume, wherein a first direction increases the volume and the opposing direction decreases the volume, or may turn the speaker on and off, or may index a through a song list with a first direction advancing to the next sone and the opposite direction advancing back to a previous song. Also, rotation may fast-forward or rewind a song. An actuator return may be configured between the speaker housing and speaker base to return the speaker to an original position after rotation to control a function of the speaker. The actuator return may be a torsional spring or elastomeric material that is stretched or compressed when the speaker is rotated with respect to the speaker base.

The speaker base may be cylindrical in outer shape and may have an outer diameter that is about the same as the stem cap or within about 20% of the diameter of the stem cap, or even within about 10% of the diameter of the stem cap. Likewise, the speaker housing may be cylindrical in shape and also about the same size as the stem cap, or within about 20% of the diameter of the stem cap, or even within about 10% of the diameter of the stem cap. The outer diameter of the speaker and/or the base may be about 40 mm or more, about 50 mm or more, about 65 mm or more, about 75 mm or less and any range between and including the diameter values provided.

The speaker housing may have speaker sound apertures in the top of the speaker. A waterproof layer may be configured to prevent water from getting into the interior of the speaker and onto the components of the speaker, the controller, the battery and the like.

The controller of the speaker, such as a microchip, may receive input from the speaker control interface to change a function of the speaker. The speaker control interface may interface with a speaker switch or may be the switch to provide input to the controller. A single quick depression of the speaker housing down on the base may initiate a first action by the controller and a second quick depression may initiate a second action by the controller. For example, a first quick depression may turn the volume down and a second depression may turn the volume down further. An extended depression may initiate a different function. Depressing and holding the speaker housing in a depressed position for an extended input time, will hold the speaker control interface in an input configuration for said extended input time. The controller may be programmed to turn off the speaker, if the speaker was on, when the speaker control interface is held in a depressed position for the extended input time. Likewise, the controller may be programmed to turn on the speaker, if the speaker was off, when the speaker control interface is held in a depressed position for the extended input time. Similarly, lateral forces on the speaker may cause a different speaker control to be actuated to, for example, skip a song or adjust volume. In another embodiment, rotational forces on the speaker housing may be configured to actuated the speaker control interface, for example, twisting the speaker may cause the volume to increase.

The speaker assembly may have a height of about 30 mm or more, about 40 mm or more, about 50 mm or more, about 60 mm or more, about 75 mm or less and any range between and including the height values provided.

The speaker assembly may have a speaker auxiliary interface, such as a USB receiver, to allow charging of a speaker battery, loading audio files on the speaker or linking an App from a mobile device with the speaker. The App may allow setting preference or a playlist that may be stored in the speaker data storage.

The snap-fit coupling of the of the speaker housing to the speaker base may have a flange release lever to enable the speaker housing to be detached from the speaker base. This may enable the speaker and/or speaker housing to be quickly removed from the base without unthreading the base from the stem cap.

A stem cap audio system may further include a sealing skirt that extends around the outer perimeter of speaker assembly, such as around a portion of the speaker housing and/or speaker base. The sealing skirt may extend up over the speaker auxiliary interface and also up over the interface between the speaker and the base, to prevent dirt from getting into the speaker control interface.

The speaker assembly provides a durable, easy to operate centrally located system that quick and easily detaches to a bicycle stem cap. The exemplary speaker housing or speaker assembly has no exposed buttons or switches that can become contaminated with dirt and debris from road and more particularly mountain biking. The speaker can be operated while riding and the speaker quickly detaches with a few turns of the base.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
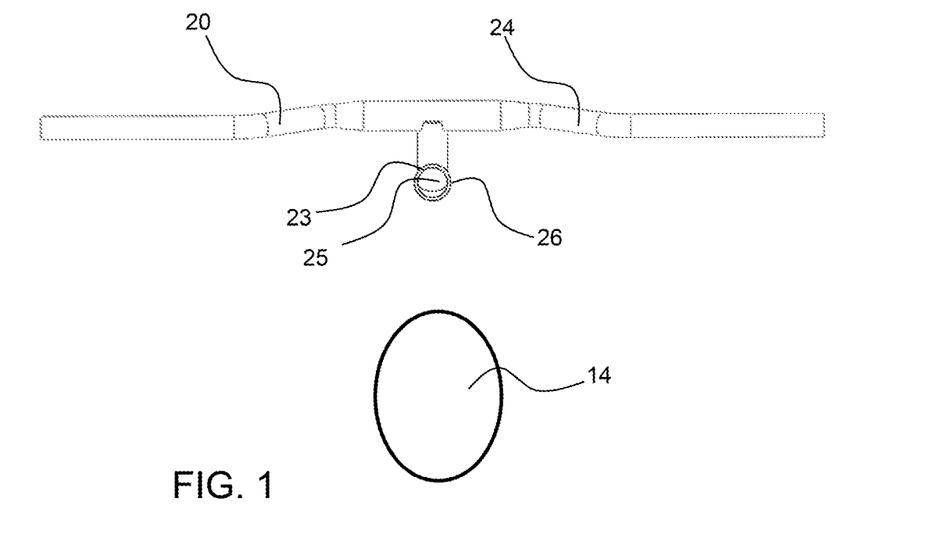
FIG. 1 shows a top view of a user positioned on a bicycle having handlebars a stem and a stem cap.
Figure 2:
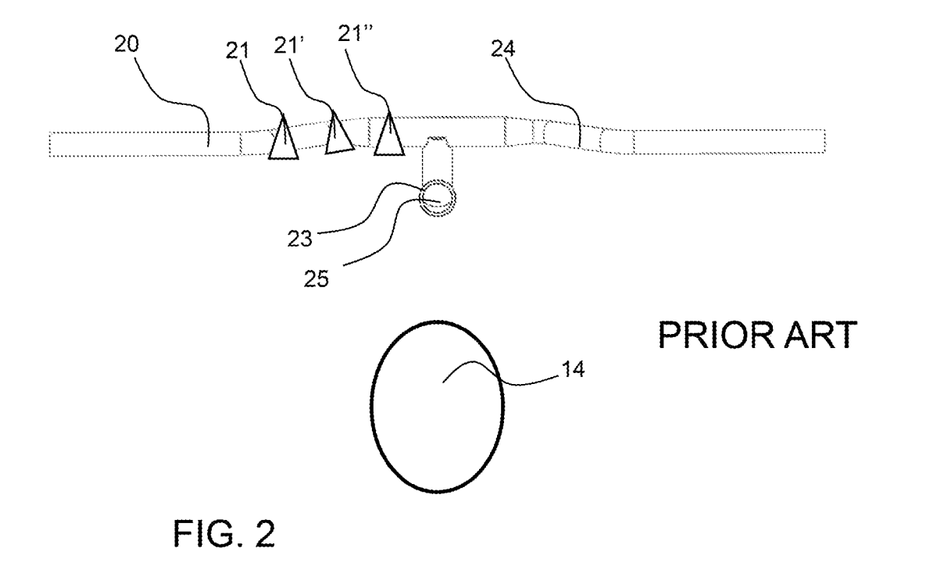
FIG. 2 shows a top view of a user positioned on a bicycle and conventional speaker mount locations along the handlebar.
Figure 3:
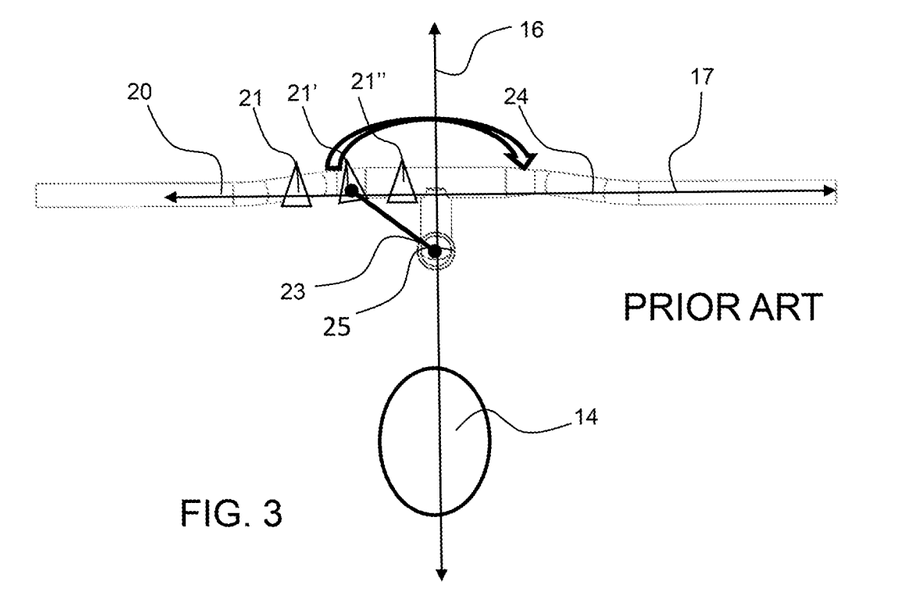
FIG. 3 shows a top view of a user positioned on a bicycle and conventional speaker mount locations along the handlebar and the offset distance of the speaker from the stem cap.

Referring now to FIGS. 1 to 3, conventional bicycle speaker mount locations 21, 21' 21" are along the handlebar 24 of the bicycle 20. As discussed herein, this takes up a portion of the handlebar that might otherwise be used for or required for a light, bike computer, drop seat actuator, mobile phone holder and the like. Also, as shown in FIG. 3, a speaker configured on the handlebar will be offset from a centerline axis 16 of the bicycle and user 14 (bicycle rider or cyclist), and therefore the sound will be louder on one side of the user versus the other. Also, the sound will change as the rider turns the handlebar which causes the speaker to move with respect to the centerline axis 16. Note that the stem 23 and stem cover 25, configured over the stem aperture 26, are configured along the centerline axis 16 of the bicycle 20.

Figure 4:
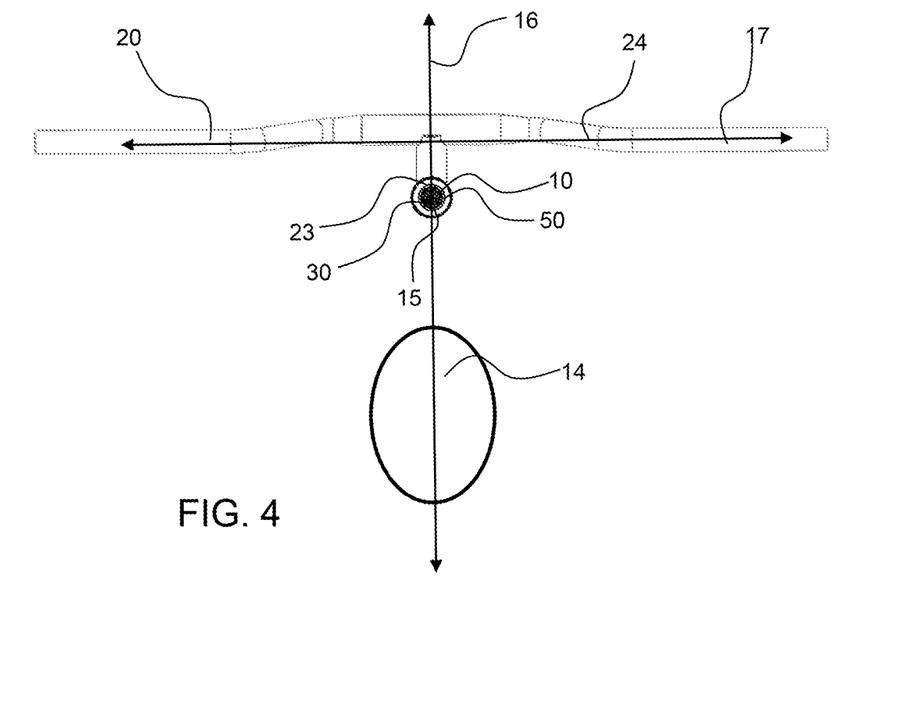
FIG. 4 shows a top view of an exemplary stem cap audio system coupled to the stem cap of a bicycle and centrally located in front of the user.

As shown in FIG. 4, an exemplary stem cap audio system 10 is coupled to the stem cap 30 and centrally located along the centerline axis 16 of the bicycle 20 and user 14. The speaker assembly 15 including the speaker 50 are detachably attached to the stem cap 30. The stem cap is detachably attachable to the stem 23 of the bicycle.

Figure 5:
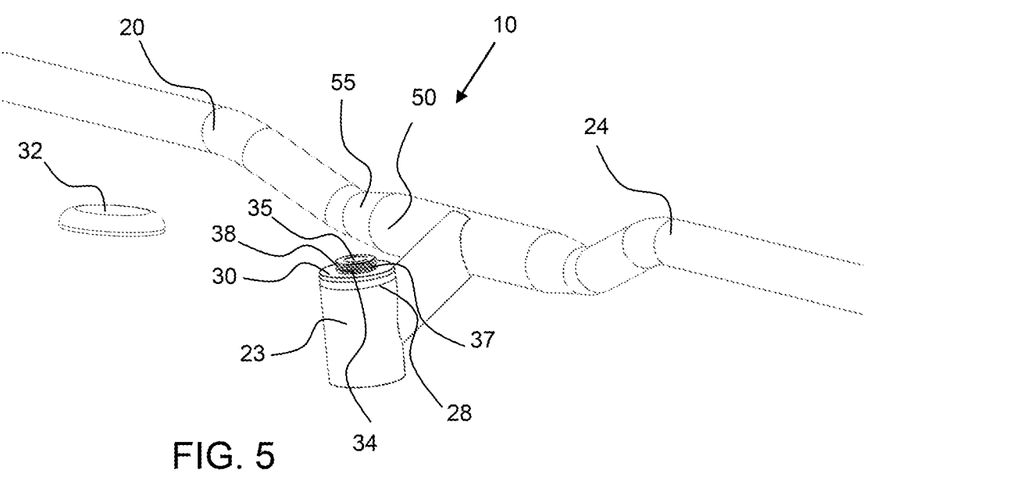
FIG. 5 shows a perspective view of an exemplary stem cap of a bicycle.
Figure 6:
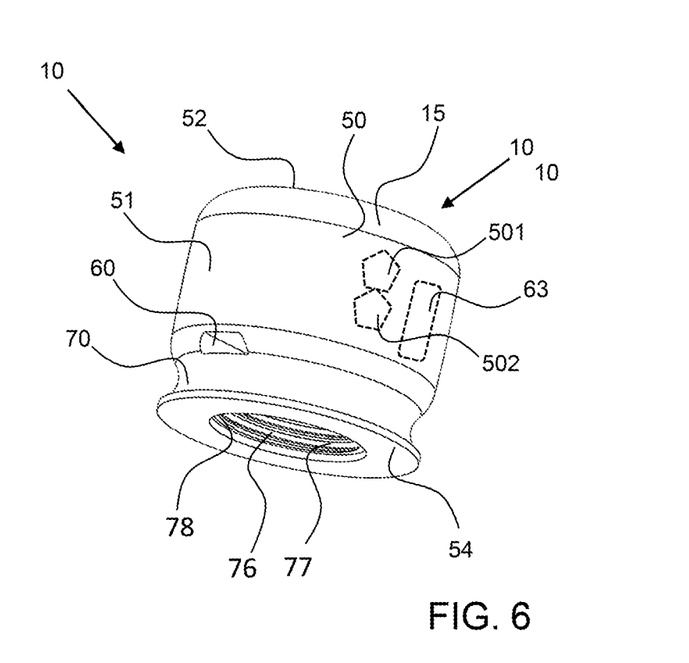
FIG. 6 shows a perspective view of an exemplary stem cap audio system having a speaker portion and a speaker base portion.

Referring now to FIGS. 5 and 6, an exemplary stem 23 of a bicycle is coupled around a steerer tube 28 of the bicycle 20. The stem cap 30 is coupled to the stem 23. The stem cap may have a fastener aperture for a stem fastener 35 to extend through and couple the stem cap with a threaded aperture in the steerer tube 28 to tighten the stem cap down over the steerer tube and stem 23. The stem cap audio system 10 may include a stem cap cover 32 that can be threaded down onto the stem cap post 34 when the speaker assembly is not attached to the stem cap 30. The exemplary stem cap has a stem cap mounting feature 37, that includes a stem cap post 34 with stem threads 38. As shown in FIG. 6, an exemplary stem cap audio system 10 includes a speaker assembly 15 including a speaker 50 configured within a speaker housing 51 and a speaker base 70 that are coupled together to allow actuation of the speaker or speaker housing with respect to the speaker base to actuate a speaker control interface. The speaker base 70 of the speaker assembly 15 is configured to detachably attach to a stem cap 30, such as to the stem cap mounting feature 37, as shown in FIG. 5. The audio mounting feature 77, base threads 78 along the attachment aperture 76 of the speaker base 70, are configured to thread onto the stem threads 38 on the stem cap post 34.

The speaker has an auxiliary interface 60 such as a USB type connector to enable charging of a speaker battery 63 and interfacing with the speaker controller 501, shown in dashed lines. The controller 501 may interface with data storage 502 to retrieve songs that are played by the speaker.

Figure 7:
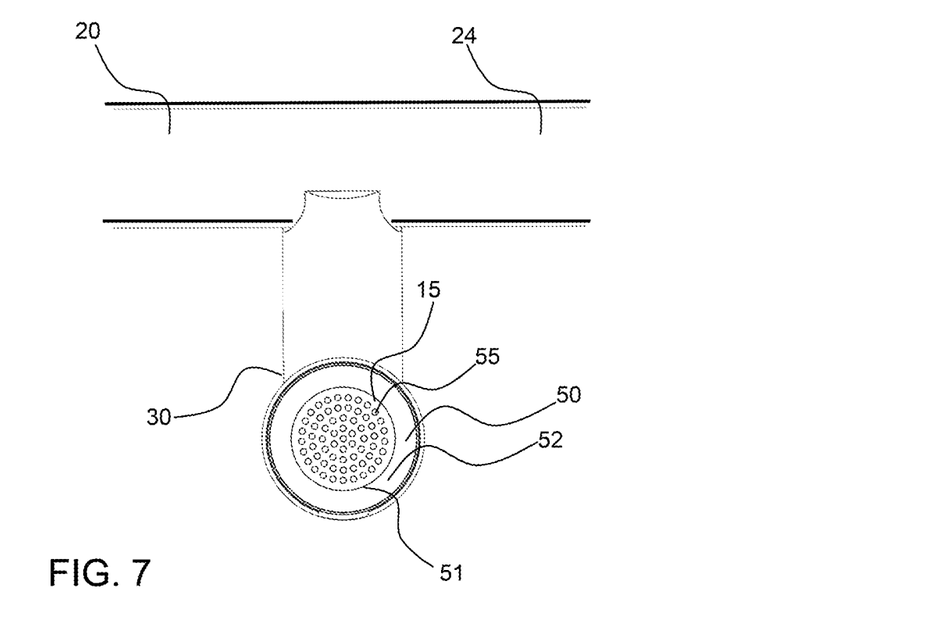
FIG. 7 shows a top view of an exemplary stem cap audio system coupled to the stem cap of a bicycle.

As shown in FIG. 7, an exemplary stem cap audio system 10 is coupled to the stem cap 30 that is detachably attached to the stem a bicycle 20. The top 52 of the speaker housing 51 has speaker sound apertures 55 to allow sound to pass therethrough. As described herein, the speaker assembly 15 has no exposed button or switches when attached to the stem cap. Also, the speaker 50 may be water resistant or waterproof and a water barrier may be configured between the speaker sound apertures and the interior of the speaker housing 51.

Figure 8:
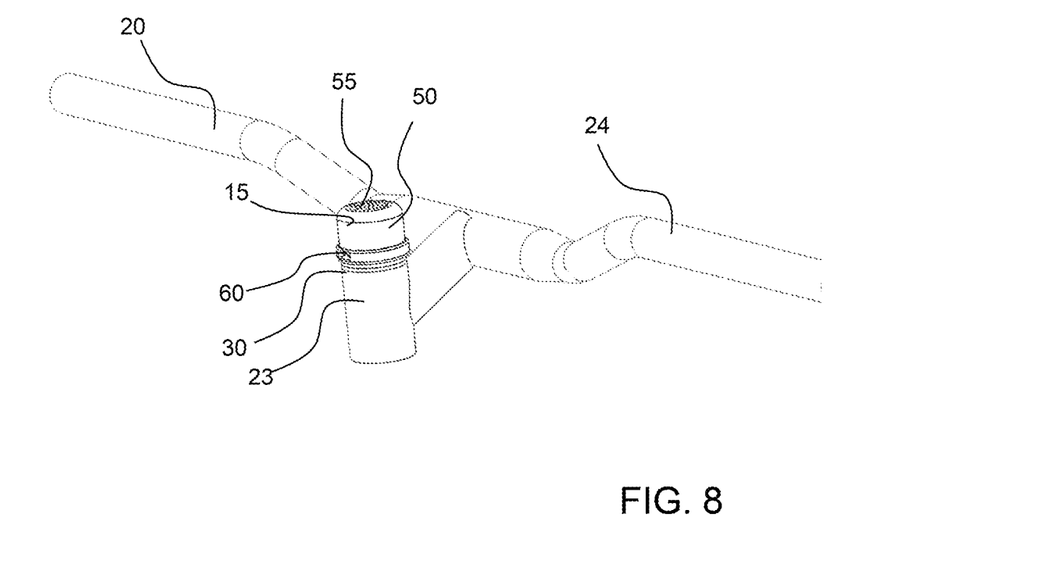
FIG. 8 shows a perspective view of an exemplary stem cap audio system coupled to the stem cap of a bicycle.

As shown in FIG. 8, an exemplary stem cap audio system 10 is coupled to the stem cap 30 of a bicycle 20. The speaker assembly 15 extends up from the stem cap to provide sound that is centrally located in front of the user or bicycle rider.

Figure 9:
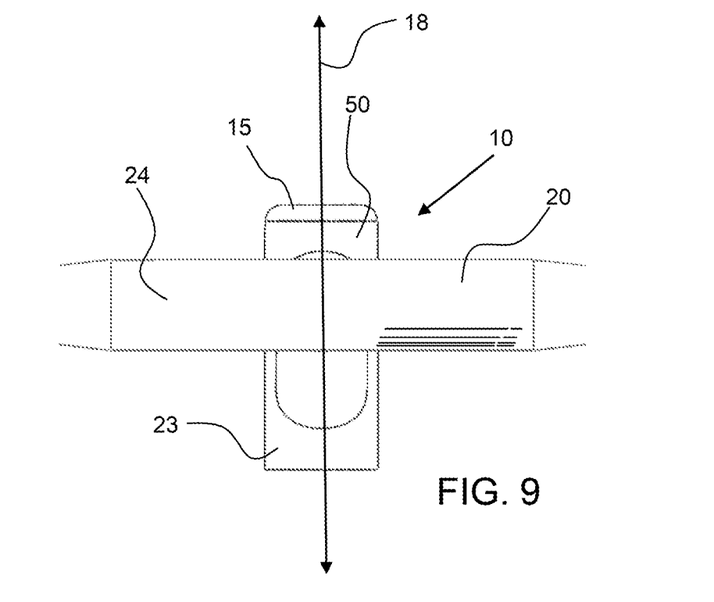
FIG. 9 shows a front view of an exemplary stem cap audio system coupled to the stem cap of a bicycle.

As shown in FIG. 9, an exemplary stem cap audio system 10 is coupled to the stem cap configured on the stem 23 of a bicycle 20. The speaker assembly extends up generally along a vertical axis 18 when coupled to a bicycle stem cap and when the bicycle is on a horizontal surface.

Figure 10:
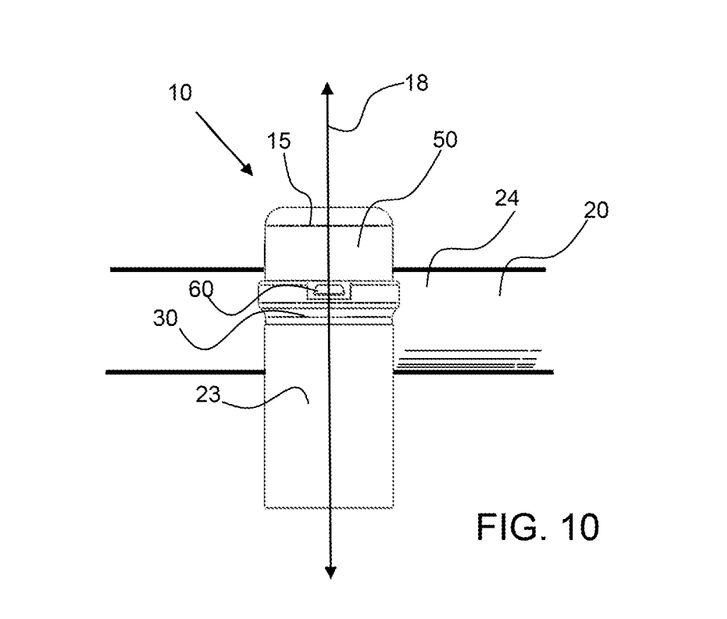
FIG. 10 shows a back view of an exemplary stem cap audio system coupled to the stem cap of a bicycle.

As shown in FIG. 10, an exemplary stem cap audio system 10 is coupled to the stem cap 30 configured on the stem 23 of the bicycle 20.

Figure 11:
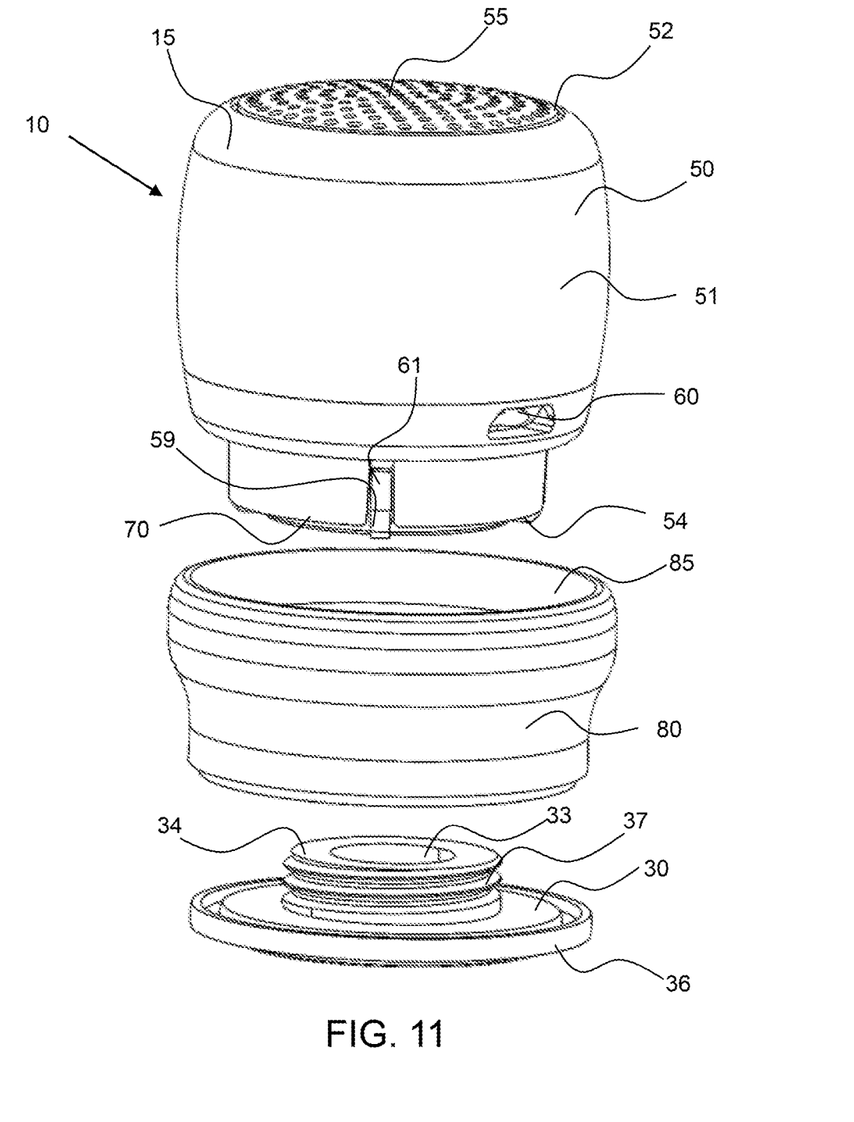
FIG. 11 shows a perspective view of an exemplary stem cap audio system comprising a speaker and a speaker base configured to couple to a stem cap of a bicycle.

As shown in FIG. 11, an exemplary stem cap audio system 10 includes a speaker assembly 15 including a speaker 50 and a speaker base 70 configured to couple to a stem cap 30 configured to detachably attach over a stem aperture of a stem. The stem cap 30 has a fastener aperture 33 configured to receive a fastener therethrough to couple the stem cap with the steerer tube and over the stem aperture. The speaker 50 and speaker housing are coupled to the speaker base 70 by a speaker flange 59 which may be released by the flange release 61, such as a lever. This enables the speaker to be quickly detached from the speaker base 70.

The speaker housing 51 may be snap-fit onto the speaker base 70 and a flange release may not be included whereby the speaker housing and speaker base are secured together as a one-piece unit. The speaker base 70 is configured to attach to the stem cap mounting feature 37, the stem cap post having stem threads 38. The stem cap has a stem cap flange 36 that extends radially out from the stem cap post. A sealing skirt 80 is configured to extend over a portion of the speaker housing 51 and speaker base 70 to prevent dirt and debris from getting into the speaker housing or auxiliary interface 60. The speaker housing 51 has a height from the top 52 to the bottom 54. The speaker housing 51 has a generally cylindrical outer perimeter and tapers in dimension for coupling with the speaker base 70.

Figure 12:
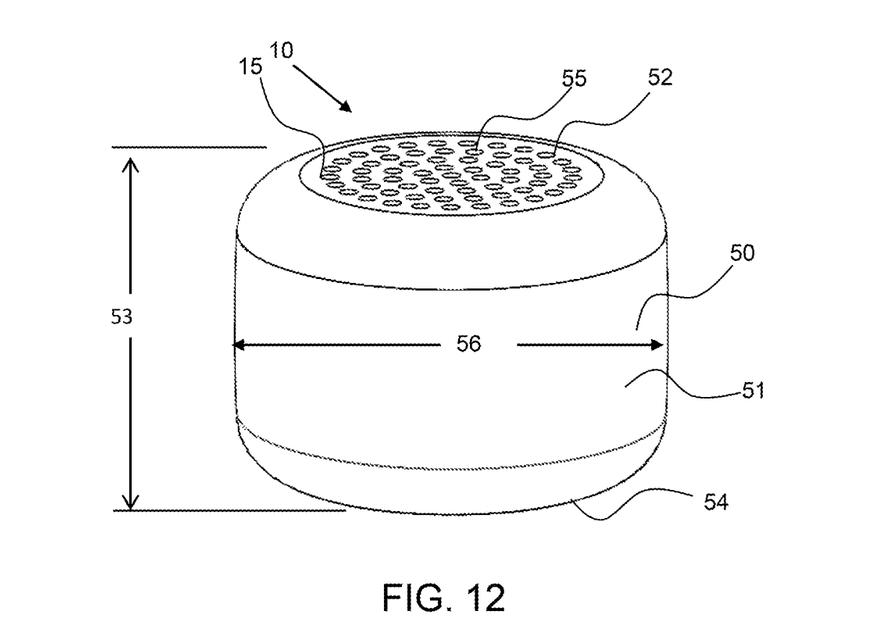
FIG. 12 shows a top perspective view of an exemplary stem cap audio system.
Figure 13:
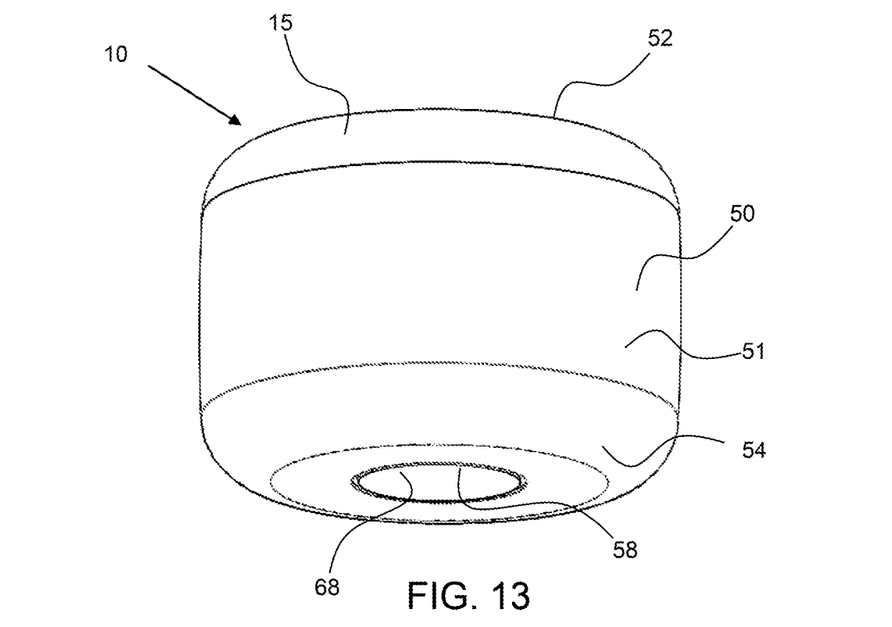
FIG. 13 shows a bottom perspective view of an exemplary stem cap audio system.

Referring now to FIGS. 12 and 13, an exemplary stem cap audio system 10 includes a speaker 50 configured in a speaker housing 51 having a height 53 from the bottom 54 to the 52. The speaker housing 51 has a generally cylindrical outer perimeter with a diameter 56. The speaker has sound apertures 55 in the top 52 of the speaker housing 51 and a speaker control interface 58, such as a push-button 68, configured on the bottom 54 of the speaker housing and configured for activation by pressing down on the speaker housing when configured in the speaker base (not shown).

Figure 14:
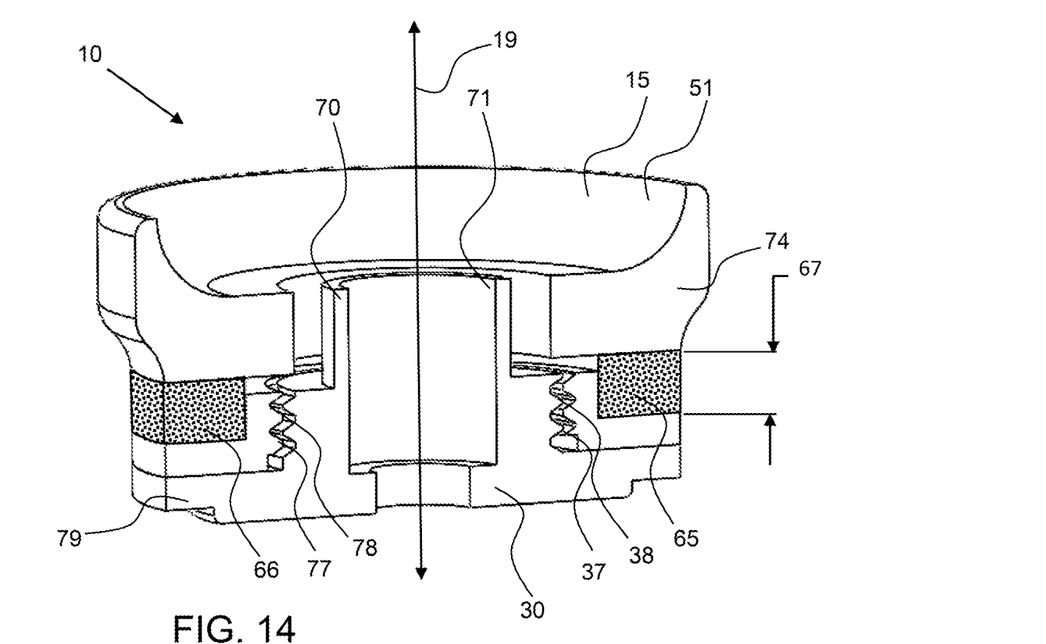
FIG. 14 shows a cross sectional view of an exemplary speaker base detachably attached to a stem cap.
Figure 15:
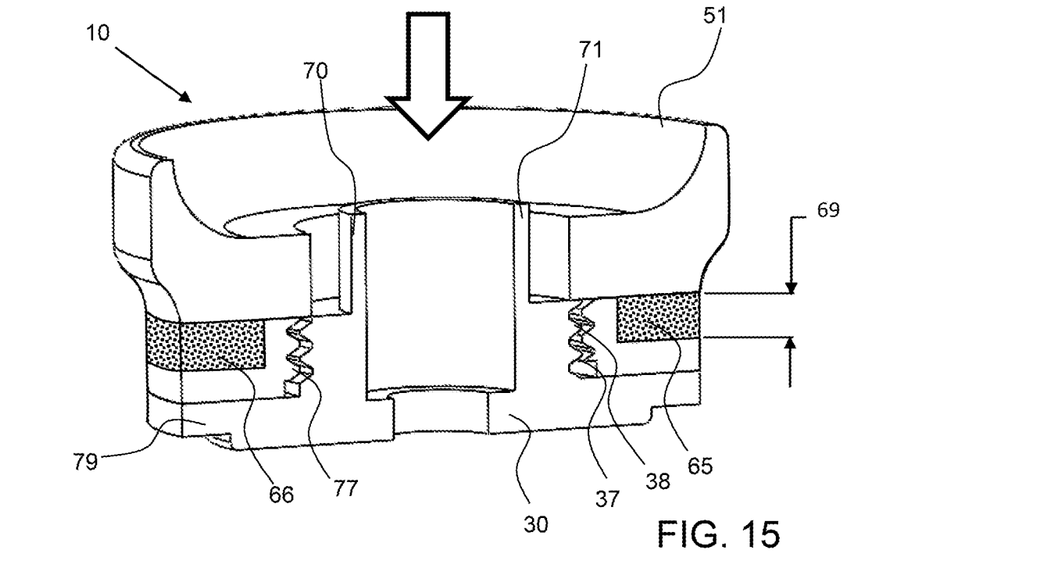
FIG. 15 shows a cross sectional view of the exemplary speaker base shown in FIG. 14 and pressed down to compress the elastomeric interface between the speaker base and the stem cap.

Referring now to FIGS. 14 to 15, the speaker base 70 is configured to detachably attach to the stem cap 30 by the audio mounting feature 77, base threads 78, configured to thread onto the stem threads 38. The speaker base 70 is fixed in position when secured to the stem cap 30 and the speaker housing 51 (partially shown) is configured to actuate down toward the speaker base and stem cap to actuate the speaker control interface or push button on the bottom of the speaker housing (not shown). The speaker base has a base actuator post 71 centrally located and extending up to interface with the speaker control interface. An actuator return 64, such as an elastomeric interface 65 is configured as an elastomeric ring 66 between the speaker base 70 and the speaker housing 51. Note that a spring or other resilient coupling device may also be used as an actuator return. As shown in FIG. 14, the elastomeric interface 65 has a resting thickness 67 and as shown in FIG. 15, depressing the speaker housing 51 toward the speaker base 70 compresses the elastomeric interface 65 to a compressed thickness 69.

Figure 16:
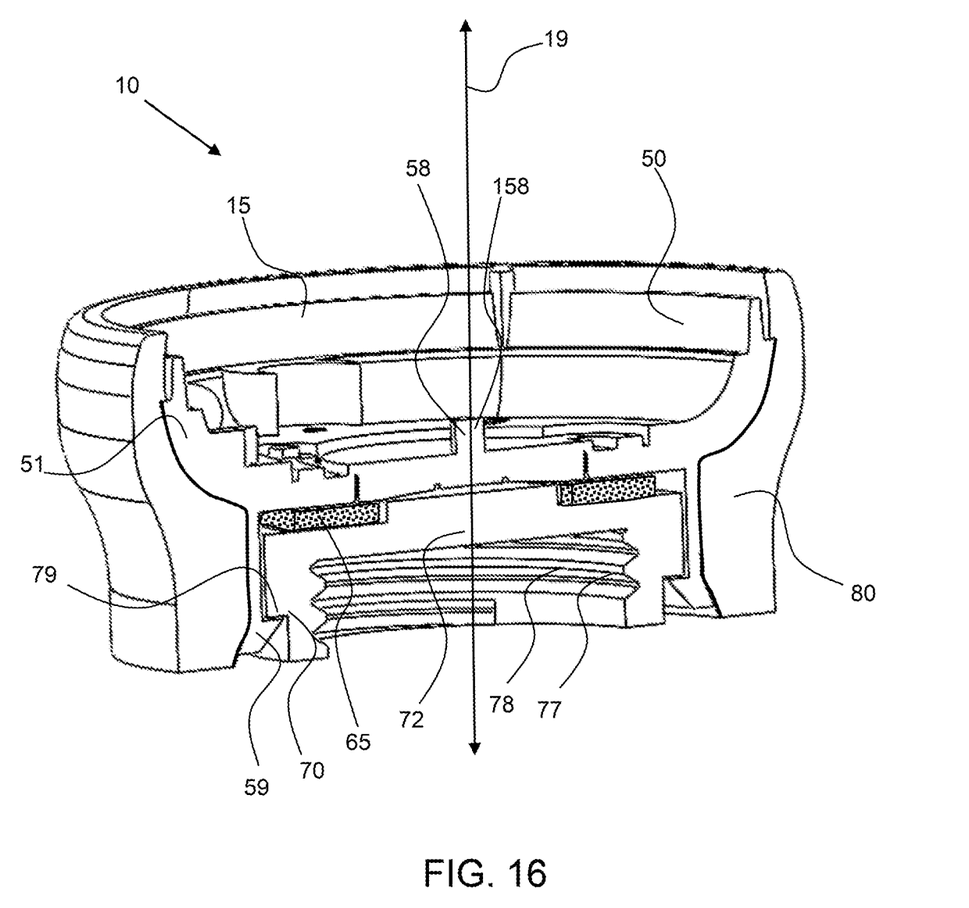
FIG. 16 shows a cross sectional view of an exemplary stem cap audio system having the speaker attached to the speaker base and a sealing skirt extending around the speaker base and up over the interface between the speaker housing and speaker base.
Figure 17:
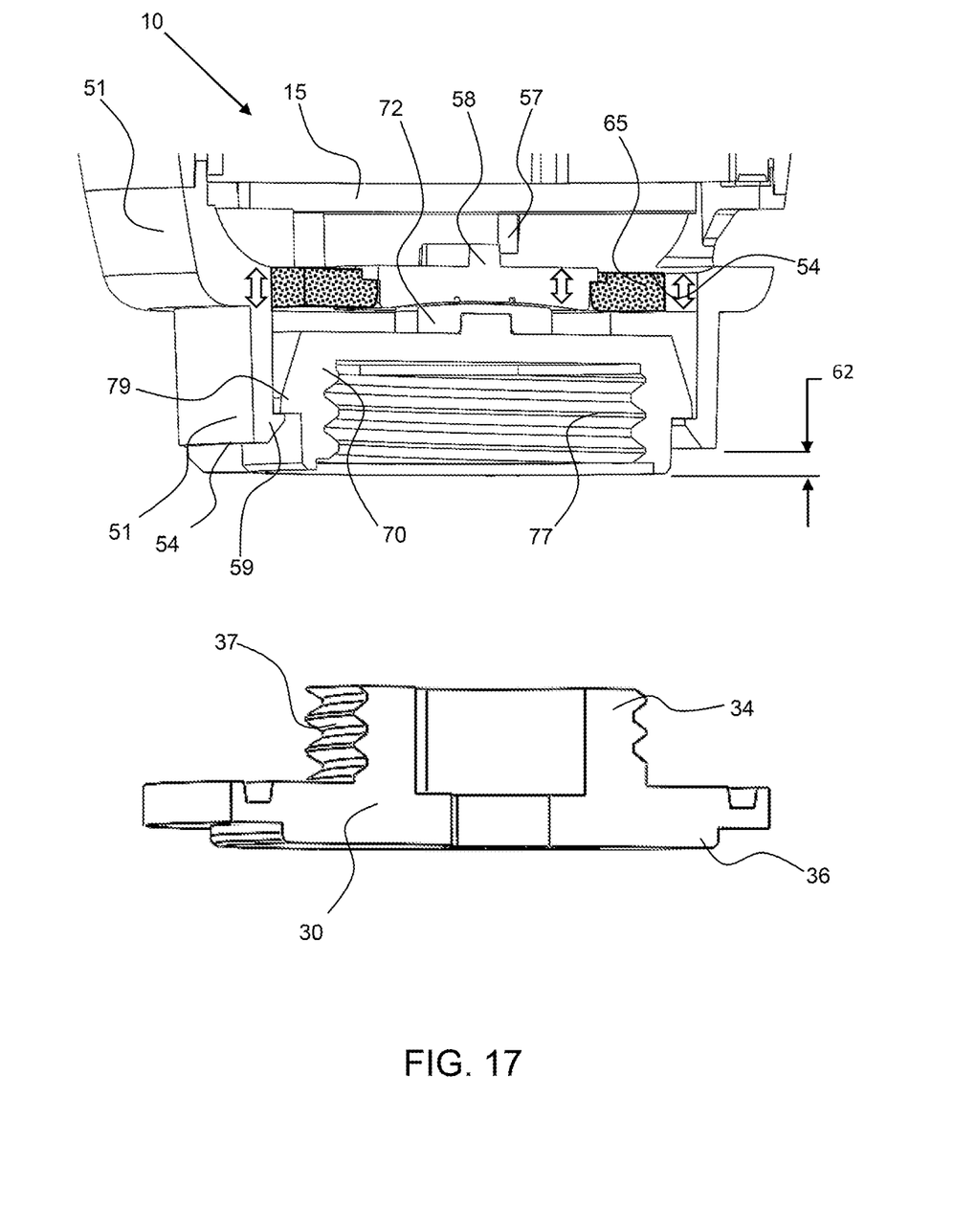
FIG. 17 shows a cross sectional view of an exemplary stem cap audio system having the speaker attached to the speaker base.

Referring now to FIGS. 16 and 17, the exemplary speaker base 70 is coupled to the speaker housing 51 by a base flange 79 that interfaces with the speaker flange 59 to retain the speaker housing 51 to the speaker base 70. As described herein a plurality of discrete base flanges and/or speaker flanges may be configured to interface around the perimeter of the speaker base. In an exemplary embodiment, the speaker base has a continuous flange around the perimeter and the speaker housing has a plurality of discrete speaker flanges that flex to snap fit down under the base flange to secure the speaker housing 51 to the speaker base. This type of flange interface coupling allows the speaker housing to be actuated down toward the speaker base and stem cap when attached to the stem cap to actuate the speaker control interface. The speaker flange will move down away from the fixed base flange and the speaker housing will compress the elastomeric interface 65. As shown in FIG. 16, the speaker control interface 58 will be actuated up when the speaker housing 51 is depressed down along the height axis 19 (centrally located along the speaker housing and extending from the top to the bottom of the speaker housing) of the speaker assembly toward the stem cap. This type of speaker control interface 58 is a depression speaker control interface 158, activated or actuated when the speaker or speaker housing is depressed down toward the stem cap or down along the height axis 19. The sealing skirt 80 is configured around a portion of the speaker housing 51 and the speaker base 70.

As shown in FIG. 17, the speaker control interface 58 or push button, is pushed upward by the base actuator 72, an extension of the speaker base located to press on the speaker control interface 58 when the speaker housing is pressed down toward the speaker base. The speaker control interface 58 may interface with a speaker switch 57, to provide a signal to the speaker controller. The switch may be a mechanical switch or magnetic or electrical switch. The actuator offset 62 or range of motion of the actuation of the speaker housing 51 with respect to the speaker base 70 is shown. The elastomeric interface 65 is an elastomeric ring 66 and is configured between a bottom 54 of the speaker housing 51 and the top portion of the speaker base 70. As shown in FIG. 17, the speaker flange 59 is secured against the base flange 79 by a force exerted by the elastomeric interface 65.

Figure 18:
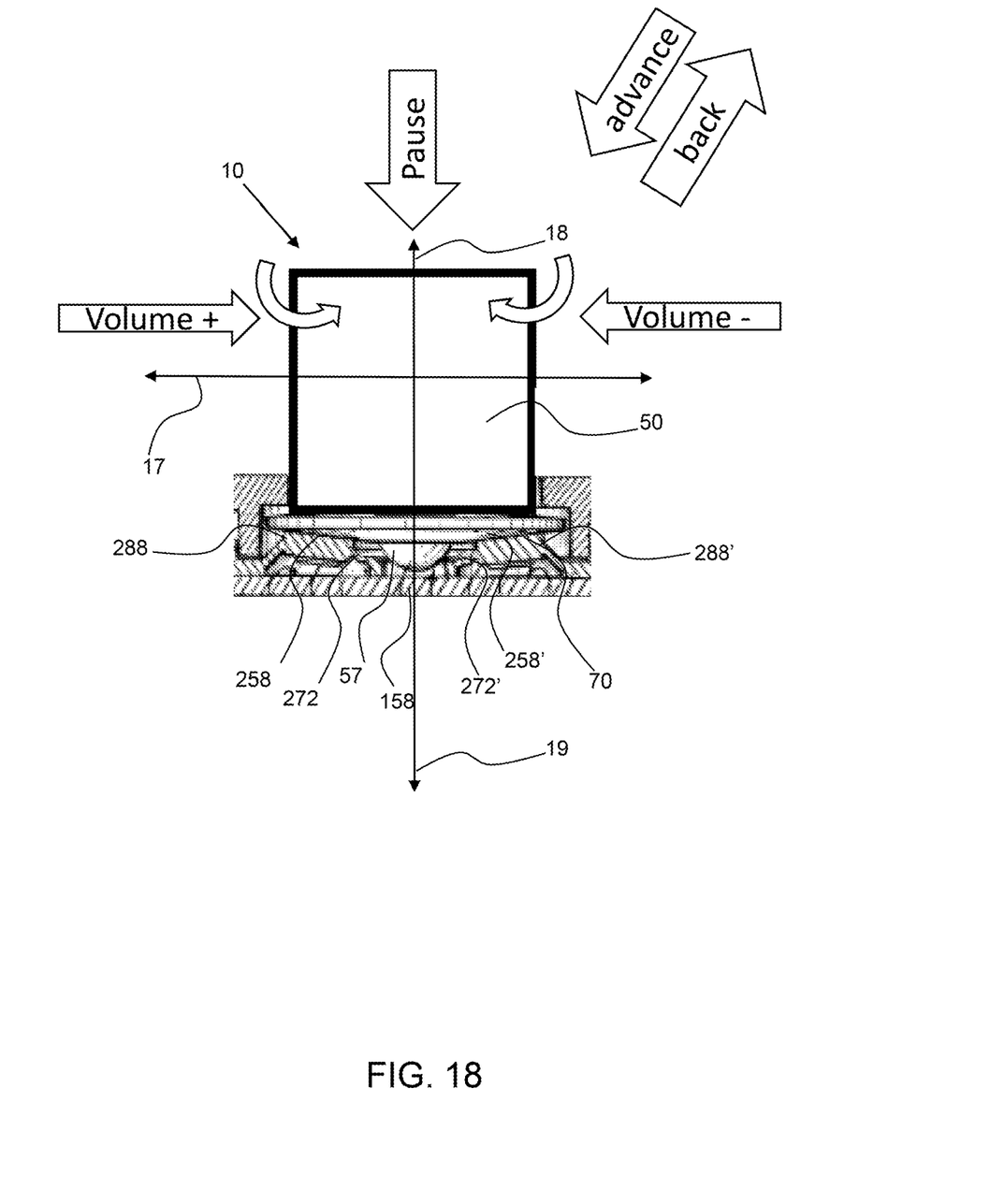
FIG. 18 shows a cross sectional view of an exemplary stem cap audio system having the speaker attached to the speaker base and a plurality of sensors in the base configured to enable multiple control functions based on the direction of movement of the speaker with respect to the speaker base. Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

FIG. 18 shows a stem cap audio system 10 having a depression speaker control interface, lateral speaker control interfaces and rotational speaker control interfaces to provide a variety of control functions for the speaker. The speaker 50 is coupled to the speaker base 70 that is outfitted with actuators 272, 272', for example, that interface with lateral speaker control interfaces 258, 258', such as switches or electrical contacts. When the speaker 50 is moved laterally along the lateral plane 17, orthogonal to the height axis 19, such as being pushed and tilted or pivoted in a particular direction an actuator interfaces with a lateral speaker control interface to provide an input signal to the controller 501. The actuators and lateral speaker control interfaces may be configured at various angular positions about the speaker, such as at least 20 degrees offset, or about 90 degrees apart providing four distinct control switches, or about 60 degrees apart, providing six distinct control switches.

The speaker assembly may also have a rotational speaker control interface 288, 288' that are configured to couple with an actuator such that when the speaker is rotated, an actuator interfaces with a rotational speaker control interface. A single rotational speaker control interface may be actuated or activated by rotation of the speaker in a first and in a second direction. The rotational speaker control interface may be a switch that closes a first circuit when the speaker is rotated a first direction and a switch that closes a second circuit when the speaker is rotated a second direction, opposite of said first direction. This concept is generally shown in FIG. 17 as well. A first rotational control interface 288 may be configured to be actuated or be activated when the speaker is rotated in a first direction, such as clockwise with respect to the height axis 19 of the speaker, and this may control a function such as volume, advancing or rewinding music, etc. A second rotational interface 288' may be configured to actuate or be activated when the speaker is rotated in a second direction, such as counterclockwise with respect to the top of the speaker, and this may control a function such as volume, advancing or rewinding music, and the like.

Also, as shown in FIGS. 1 to 18, an upward or downward force may provide additional switches for controlling functions of the speaker. The speaker control interface 58 or push button, may be pushed upward by the base actuator 72, an extension of the speaker base located to press on the depression speaker control interface 158 when the speaker housing is pressed down toward the speaker base. The speaker control interface 58 may interface with a speaker switch 57, to provide a signal to the speaker controller. The switch may be a mechanical switch or magnetic or electrical switch.

The large arrows show an example of the functions that may be controlled by pushing on the speaker in a particular direction, wherein side to side movement increase and decreases the volume, downward force pauses the music, forward movement or force on the speaker advances the music, or advances to the next song and pulling back on the speaker toward the cyclist rewinds the music or plays the preceding song. Note that rotational motion may advance a song or rewind a song or the audio file, while forward to back advances to a new song or plays a preceding song, depending on direction. These are examples of how actuation of the speaker 50 in different directions, including axially, laterally and rotationally initiates different functions or types of functions of the stem cap audio system 10.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. A stem cap audio system comprising:
 a) a stem cap configured to couple with a stem of a bicycle;
 b) speaker assembly that is detachably attached to said stem cap, said speaker assembly comprising:
  i) a speaker housing comprising:
   a speaker;
   a top;
   a bottom;
   speaker sound apertures;
   a speaker control interface; and
   a controller;
  ii) a speaker base having an audio mounting feature that detachably attaches the speaker assembly to said stem cap; and
 wherein the speaker housing is configured to actuate with respect to the speaker base to actuate the speaker control interface, and
 wherein the speaker assembly is configured along a centerline axis of the bicycle.
2. The stem cap audio system of claim 1, further comprising an actuator return configured between the speaker housing and the speaker base that returns the speaker housing to an original position after being actuated toward the speaker base to actuate the speaker control interface.

3. The stem cap audio system of claim 1, wherein the speaker control interface comprises a depression speaker control interface and wherein the speaker housing is configured to actuate toward the speaker base to actuate the depression speaker control interface.

4. The stem cap audio system of claim 3, wherein the depression speaker control interface is a push-button configured on the bottom of the speaker housing.

5. The stem cap audio system of claim 4, further comprising an actuator return configured between the speaker housing and the speaker base that returns the speaker housing to an original position after being actuated toward the speaker base to actuate the speaker control interface.

6. The stem cap audio system of claim 5, wherein the actuator return is an elastomeric interface comprising an elastomeric material.

7. The stem cap audio system of claim 6, wherein the actuator return is an elastomeric ring.

8. The stem cap audio system of claim 1, wherein the speaker base comprises a base flange and wherein the speaker housing comprises a speaker flange and wherein the base flange interfaces with speaker flange to retain and couple the speaker housing to the speaker base.

9. The stem cap audio system of claim 8, comprising a plurality of discrete speaker flanges or discrete base flanges.

10. The stem cap audio system of claim 9, further comprising a flange release and wherein the speaker base is detachably attachable to the speaker housing by actuating the flange release.

11. The stem cap audio system of claim 10, wherein the audio mounting feature of the speaker base comprises base threads configured to thread onto stem threads of the stem cap.

12. The stem cap audio system of claim 1, wherein the speaker further comprises a speaker auxiliary interface and wherein the speaker auxiliary interface comprises a USB receiver.

13. The stem cap audio system of claim 1, further comprising a sealing skirt configured around a portion of the speaker housing including the speaker auxiliary interface and over at least a portion of the speaker base.

14. The stem cap audio system of claim 1, wherein the speaker control interface comprises a plurality of lateral speaker control interfaces wherein the speaker housing is configured to actuate with respect to the speaker base in a first lateral direction to actuate a first speaker control interface and actuate in a second lateral direction at least 20 degrees different than said first direction, to actuate a second lateral speaker control interface of said plurality of lateral control interface.

15. The stem cap audio system of claim 14, wherein the speaker control interface comprises a first rotational speaker control interface that is actuated when the speaker is rotated in a first rotational direction with respect to the speaker base.

16. The stem cap audio system of claim 15, wherein the speaker control interface comprises a second rotational speaker control interface that is actuated when the speaker is rotated in a second rotational direction, opposite said first rotational direction with respect to the speaker base.

17. The stem cap audio system of claim 1, wherein the speaker control interface comprises a first rotational speaker control interface that is actuated when the speaker is rotated in a first rotational direction with respect to the speaker base.

18. The stem cap audio system of claim 17, wherein the speaker control interface comprises a second rotational speaker control interface that is actuated when the speaker is rotated in a second rotational direction, opposite said first rotational direction with respect to the speaker base.

19. The stem cap audio system of claim 1, wherein the speaker control interface comprises a depression speaker control interface and wherein the speaker housing is configured to actuate toward the speaker base to actuate the depression speaker control interface; and wherein the speaker control interface comprises a plurality of lateral speaker control interfaces wherein the speaker housing is configured to actuate with respect to the speaker base in a first lateral direction to actuate a first speaker control interface and actuate in a second lateral direction at least 20 degrees different than said first direction, to actuate a second lateral speaker control interface of said plurality of lateral control interface.

20. The stem cap audio system of claim 19, wherein the speaker control interface comprises a rotational speaker control interface that is actuated when the speaker is rotated in a rotational direction with respect to the speaker base.

* * * * *